US005885684A

United States Patent [19]

Hefner et al.

[11] Patent Number: 5,885,684

[45] Date of Patent: Mar. 23, 1999

[54] RUG HAVING RELIEF PATTERN, AND METHOD FOR FORMING

[76] Inventors: Gary L. Hefner; Cynthia D. Hefner, both of 209 Rosen Dr., Dalton, Ga. 30721

[21] Appl. No.: 967,498

[22] Filed: Nov. 11, 1997

[51] Int. Cl.$^{6}$ .......... B32B 33/00

[52] U.S. Cl. .......... 428/89; 428/96; 427/275

[58] Field of Search .......... 428/89, 88, 96; 427/275, 271

[56] References Cited

U.S. PATENT DOCUMENTS 2,988,800 6/1961 White .......... 428/89

4,443,505 4/1984 Ehrenfeld .......... 428/89

*Primary Examiner*—Alexander Thomas

*Attorney, Agent, or Firm*—James B. Middleton

[57] ABSTRACT

A rug or mat having a pattern in relief is formed by printing a pattern on a rug having face yarns of a thermoplastic fiber, and subsequently heating the printed rug. The ink is applied by silk-screen, stencil or the like to apply enough ink to raise the melting point of the thermoplastic yarns, so the printed portions do not shrink as much as the untreated, or unprinted, portion of the rug. A plastisol ink has been found to protect the printed yarns. Because an ink is used to protect the yarns, the pattern can be defined by yarn height and color.

7 Claims, 1 Drawing Sheet

RUG HAVING RELIEF PATTERN, AND METHOD FOR FORMING

BACKGROUND OF THE INVENTION

1. Field of the Invention

This invention relates generally to the treatment of textile goods, and is more particularly concerned with a method for forming a relief pattern in napped textiles, and the product so formed.

2. Discussion of the Prior Art

There have been numerous efforts at forming a pattern in relief on textile goods. With tufted or other napped goods, the tufts may be originally sewn at more than one height to define a pattern in relief, or the nap may be subsequently cut, or sheared, to define a pattern. While each of these techniques has met with some success, the apparatus to determine the pattern is quite complex, so the finished products tend to be expensive.

Another prior art technique for defining a pattern in relief has been applied to small rugs, mats and the like, the technique including the steps of cutting a stencil with the desired pattern, placing the stencil over the rug, and applying hot air or other gas to melt the fibers exposed in the open areas of the stencil. The melted fibers recede to a lower height than the un-melted fibers, so a relief pattern is formed. This technique, also, has met with some commercial success but the technique creates patterns only by melting of selected areas, the colors being determined by the original color of the yarn in the rug.

SUMMARY OF THE INVENTION

The present invention provides a rug or mat having a pattern in relief, the pattern being further defined by color as desired. A pattern is defined on a napped surface by printing (for example by silk screen or stencil) in selected colors on the surface. The ink used is such that the melting point of the fibers is raised through application of the ink. Subsequently, the rug or mat is heated so the unprinted fibers melt and recede to a lower height, while the printed fibers retain a greater height. A pattern in relief is thereby formed, the higher portions of the pattern being also colored as desired.

BRIEF DESCRIPTION OF THE DRAWINGS

These and other features and advantages of the present invention will become apparent from consideration of the following specification when taken in conjunction with the accompanying drawings in which.

DETAILED DESCRIPTION OF THE EMBODIMENT

Figure 1:
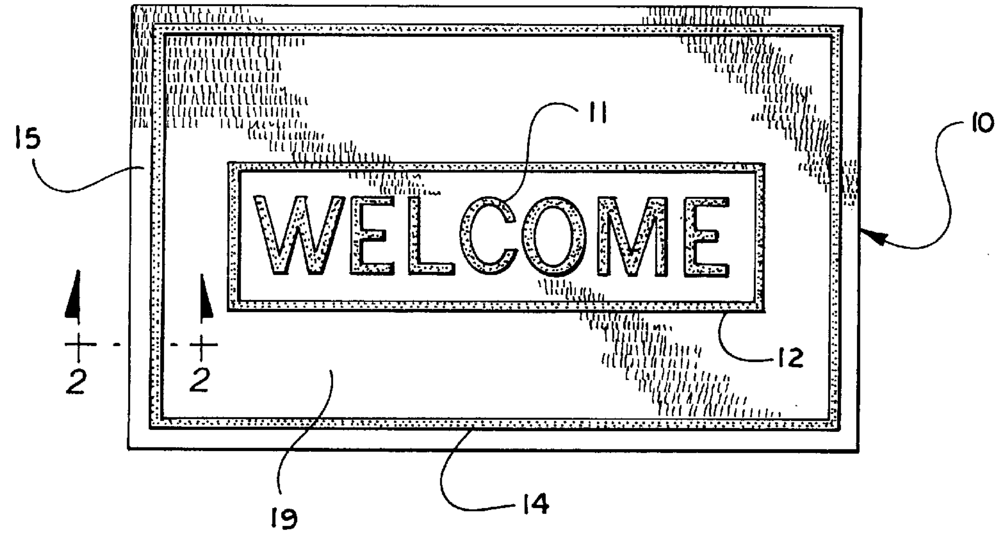
FIG. 1 is a top plan view of a mat printed in accordance with the present invention.

Referring now more particularly to the drawings, and to that embodiment of the invention here presented by way of illustration, FIG. 1 shows a door mat generally designated at 10. The mat 10 has a pattern printed thereon, the pattern here shown being simply the word Welcome at 11 within a printed box 12, and another box 14 close to the border of the mat 10. It will be understood that the mat 10 is tufted or otherwise provided with a napped surface. The printing is here represented by the stippled surfaces at 11, 12 and 14.

Figure 2:
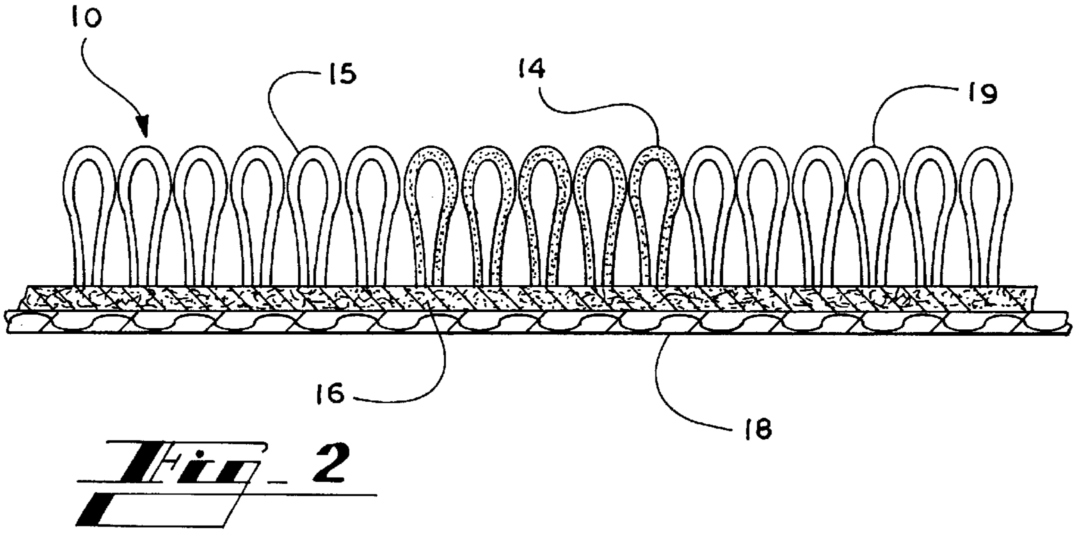
FIG. 2 is an enlarged cross-sectional view taken along the line 2—2 in FIG. 1; and, FIG. 3 is a view similar to FIG. 2 but showing the mat after heating.

Looking at FIG. 2 of the drawings, a highly enlarged cross-section of the mat is shown, the cross-section including a cross-section of the box 14. FIG. 2 illustrates the unprinted border 15 of the mat, here shown rather schematically as comprising a plurality of loops for the face yarn. The loops extend from a primary backing 16 which may be a non-woven material; and, a secondary backing 18 has been applied over the primary backing. Those skilled in the art will understand that the secondary backing 18 is optional, but it provides better dimensional stability to the mat, and better wearing characteristics.

Immediately adjoining the unprinted border 15 is the printed box 14. It will be noticed that the construction of the printed box 14 is exactly the same as the unprinted border 15, the only difference being the printing. Again, the printing is indicated by stippling.

The side of the box 14 opposite from the unprinted border 15 is an open field 19 for the "Welcome" message, and this is also unprinted. Once more, the construction of the mat in the area of the open field 19 is the same as other areas.

From the foregoing description it should be understood that one begins with a rug or mat having a tufted or other napped surface. The surface of the mat is then printed with any desired pattern. Though a simple "Welcome" is shown in the drawings, the design can be as simple as a line or two, or as complex as a rococo design. Only the printed design then distinguishes one portion of the mat from another.

After the mat has been printed, the mat will be heated. The heating can take place within an oven or the like, or by directing streams of hot air or other gas against the face of the printed mat.

Figure 3:
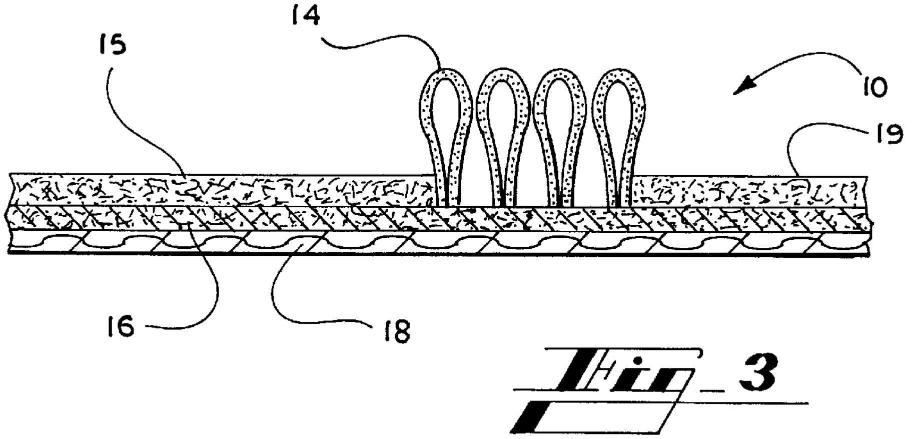

Attention is now directed to FIG. 3 of the drawings which schematically illustrates the mat 10 after heating. Here it will be seen that the face yarn on the unprinted portions has been severely reduced in size, while the face yarn on the printed portions retains its size, thereby forming a pattern in relief The unprinted border 15 is shown in FIG. 3 simply as tangled fibers. The yarns in fact melt and shrink so there is no discernible yam pattern. The schematic showing at 15 is therefore thought to be accurate. The printed box 14 is shown in FIG. 3 as the same size as in FIG. 2. This is not completely accurate since the yarns in the printed areas such as the box 14, will be somewhat reduced in size by the heating; however, the size reduction is relatively slight, and a distinct relief pattern is defined.

It is contemplated that the mat or rug will be printed by a silk screen technique, though other forms of printing may be used, such as a stencil, an airless spray gun or the like. It is important to realize that a generous amount of ink needs to be applied to the rug being printed, so off-set printing or the like may not be appropriate.

The ink to be used in the practice of the present invention must generally saturate the yarns. It has been discovered that, by saturating the yarns with an ink, the melting point of the thermoplastic yarn is raised. As a result, after printing, the yarns can be heated, and the colored yam will shrink much less than the unprinted yarns, thereby defining a printed pattern in relief Those skilled in the art will identify numerous inks and the like that will have the desired effect, but successful practice of the invention has comprised the use of a plastisol ink. The plastisol ink has been applied to a rug or mat by silk screening a pattern; then, the rug is heated. The temperature used in heating the rug must be above the melting point for the thermoplastic fiber making up the face yarn, but must be below the kindling temperature for the yarns. A trial run with any particular rug will show the time and temperature needed to yield the desired result. It will of course be understood that the weight of yarn in the rug, the type of yarn, and the type and amount of ink are variables to be considered.

Numerous inks will be found to yield the desired results in accordance with the present invention, but one ink that has been used successfully is a polyvinyl chloride dispersion sold by Calhoun Plastics & Chemicals, Inc., under the name GC-SML Printing Inks.

It will therefore be seen that the present invention provides a method for creating a pattern in relief on rugs, mats and the like having a napped surface formed by thermoplastic fibers. The method comprises the steps of saturating selected portions of the rug with an ink that will raise the melting point of the yarn forming the napped surface, and subsequently heating the rug for melting the face yarns. The melting causes the face yarns to shrink, while the inked yarns are protected from the heat and shrink very little, definitely less than the un-printed years. The result is that a pattern in relief is formed, with the printed areas protruding from a background of unprinted areas.

It will of course be understood by those skilled in the art that the particular embodiment of the invention here presented is by way of illustration only, and is meant to be in no way restrictive; therefore, numerous changes and modifications may be made, and the full use of equivalents resorted to, without departing from the spirit or scope of the invention as outlined in the appended claims.

What is claimed a invention is:

1. A method for defining a pattern in relief in a napped fabric, said napped fabric having thermoplastic fibers constituting the face yarns of said napped fabric, said method comprising the steps of applying ink to said napped fabric in selected areas for defining said pattern, said ink being selected so as to raise the melting point of said thermoplastic fibers in said selected areas, and subsequently heating said napped fabric sufficiently for causing said thermoplastic fibers to be reduced in height, and not sufficiently for causing said fibers in said selected areas to be significantly reduced in height.

2. A method as claimed in claim 1, wherein said ink is a plastisol.

3. A method as claimed in claim 2, wherein said plastisol is a polyvinyl chloride dispersion.

4. A method as claimed in claim 3, wherein said napped fabric is a tufted fabric.

5. A mat having a pattern in relief defined thereon, said mat comprising a backing, face yarn on said backing for forming a napped fabric, said face yarn being formed of thermoplastic fibers, a first selected area of said mat defining said pattern on said mat, said face yarn in said first selected area being impregnated with an ink that raises the melting point of said thermoplastic yarns, said first selected area having a greater height of yarns than other areas of said mat.

6. A mat as claimed in claim 5, said first selected area being colored by said ink.

7. A mat as claimed in claim 6, wherein said napped fabric comprises a tufted fabric.

* * * * *